United States Patent [19]

Hattori

[11] Patent Number: 5,550,958
[45] Date of Patent: Aug. 27, 1996

[54] PRINTER WITH EXTENSION MEMORY CAPACITY THAT PROVIDES INSTRUCTIONS REGARDING MEMORY INSTALLATION

[75] Inventor: Hiroshi Hattori, Inazawa, Japan

[73] Assignee: Brother Kogyo Kabushiki Kaisha, Nagoya, Japan

[21] Appl. No.: 167,022

[22] Filed: Dec. 16, 1993

[30] Foreign Application Priority Data

Feb. 22, 1993 [JP] Japan ................................ 5-057782

[51] Int. Cl.$^6$ ............................................................ G06F 3/12
[52] U.S. Cl. .................................... 395/115; 395/110
[58] Field of Search .................................. 395/115, 116, 395/114, 110; 358/296; 400/692, 121

[56] References Cited

U.S. PATENT DOCUMENTS

| | | | |
|---|---|---|---|
| 4,912,670 | 3/1990 | Hattori | 364/900 |
| 4,979,132 | 12/1990 | Sugimoto | 364/520 |
| 5,129,050 | 7/1992 | Ikenoue et al. | 395/115 |
| 5,171,092 | 12/1992 | Tasaki | 400/121 |
| 5,195,176 | 3/1993 | Lung | 395/115 |
| 5,201,031 | 4/1993 | Kasaki | 395/110 |
| 5,208,676 | 5/1993 | Inui | 358/296 |
| 5,233,683 | 8/1993 | Sasaki | 395/110 |
| 5,295,239 | 3/1994 | Murakami | 395/151 |
| 5,335,316 | 8/1994 | Toyokura | 395/115 |
| 5,345,314 | 9/1994 | Ho-Il | 358/296 |
| 5,361,332 | 11/1994 | Yoshida et al. | 395/114 |

*Primary Examiner*—Raymond J. Bayerl
*Assistant Examiner*—Steven P. Sax
*Attorney, Agent, or Firm*—Oliff & Berridge

[57] ABSTRACT

According to this printer, effective extension conditions for extending extension memories to plural memory-installing slots are preliminarily stored in a ROM table. The presence or absence of the extension memories extended to the plural memory-installing slots and the capacity thereof are identified. On the basis of the identification result, it is determined whether the installing state of the extension memories is correct. If the installing state is not correct, a correct installing state is determined from the ROM table, and it is printed by a printing mechanism. Accordingly, the incorrect installing state of the extension memories is detected, and the information on the correct installing state is printed.

19 Claims, 9 Drawing Sheets

| CONDITION NUMBER | SL1 | SL2 | SL3 | SL4 |
|---|---|---|---|---|
| 1 | 0 | 0 | 0 | 0 |
| 2 | 1M | 0 | 0 | 0 |
| 3 | 2M | 0 | 0 | 0 |
| 4 | 4M | 0 | 0 | 0 |
| 5 | 8M | 0 | 0 | 0 |
| 6 | 1M | 1M | 0 | 0 |
| 7 | 1M | 2M | 0 | 0 |
| 8 | 1M | 4M | 0 | 0 |
| 9 | 1M | 8M | 0 | 0 |
| 10 | 2M | 2M | 0 | 0 |
| 11 | 2M | 4M | 0 | 0 |
| 12 | 2M | 8M | 0 | 0 |
| 13 | 4M | 4M | 0 | 0 |
| 14 | 4M | 8M | 0 | 0 |
| 15 | 8M | 8M | 0 | 0 |
| 16 | 1M | 1M | 1M | 0 |
| 17 | 1M | 1M | 2M | 0 |
| 18 | 1M | 1M | 4M | 0 |
| 19 | 1M | 1M | 8M | 0 |
| 20 | 1M | 2M | 2M | 0 |
| 21 | 1M | 2M | 4M | 0 |
| 22 | 1M | 2M | 8M | 0 |
| 23 | 1M | 4M | 4M | 0 |
| 24 | 1M | 4M | 8M | 0 |
| 25 | 1M | 8M | 8M | 0 |
| 67 | 4M | 4M | 4M | 8M |
| 68 | 4M | 4M | 8M | 8M |
| 69 | 4M | 8M | 8M | 8M |
| 70 | 8M | 8M | 8M | 8M |

Fig.6

| SLOT NUMBER | CAPACITY DATA D |
|---|---|
| SL1 | 0 |
| SL2 | 2MB |
| SL3 | 8MB |
| SL4 | 0 |

**WARNING!
RAM INSTALLATION ERROR**

CURRENT STATUS

SLOT 1
| 0 M byte |

SLOT 2
| 2 M byte |

SLOT 3
| 8 M byte |

SLOT 4
| 0 M byte |

CORRECT INSTALLATION

SLOT 1
| 2 M byte |

SLOT 2
| 8 M byte |

SLOT 3
| 0 M byte |

SLOT 4
| 0 M byte |

PRINTER WITH EXTENSION MEMORY CAPACITY THAT PROVIDES INSTRUCTIONS REGARDING MEMORY INSTALLATION

BACKGROUND OF THE INVENTION

1. Field of the Invention

This invention relates to a printer and, more particularly, to a printer into which plural extension memories can be installed.

2. Description of Related Art

In many companies, personal computers or work stations have been recently introduced in association with the development of office automation. At the same time, these computers are connected to high-speed printers, such as laser printers, dot printers or the like, through the same cable used to configure a network system in which desired print data stored in the computers are transmitted to enable print processing using a desired printer.

In general, a ROM and a RAM are provided in a control device for each printer. The ROM is stored with font data on characters, symbols, etc. and various control programs. The RAM is equipped with a memory for storing received data, a font data memory for storing special font data that is not stored in the ROM and an image data memory for converting received print data to dot-pattern image data and storing it.

The RAM in the control device of the printer is generally designed to have such a memory capacity as to store the received data and the font data by only a predetermined data amount. However, recently large amounts of font data are required to be received and stored into the RAM to improve print efficiency. Thus, the set memory capacity of the RAM is too insufficient to meet this requirement. In view of the foregoing, a printer has been employed that has plural memory-installing slots into which extension memories having desired memory capacity are detachably installed and that are connected to the control device. That is, when the memory capacity of a printer is required to be extended, one or a plural extension memories bought separately from the printer's manufacturer or another manufacturer are installed into any of the plural memory-installing slots. Whereby, the memory capacity of the printer can be easily extended.

In a printer in which extension memories can be installed, the control device thereof is generally equipped with an address conversion circuit to simplify the address management of the extension memories. To simplify the circuit construction of the address conversion circuit and reduce the cost thereof, effective extension conditions are required when one or a plural extension memories are extended to all or some of the plural memory-installing slots. One extension condition is that the extension memories are successively installed from a first memory-installing slot. Another extension condition is that the extension memories are successively installed from the memory of minimum memory capacity in order of first, second, third, . . ., n-th memory-installing slots when the extension memories have different memory capacities, etc.

As described above, the memory capacity of the RAM can be easily extended by installing desired extension memories into the memory-installing slots. However, if an installing condition of these extension memories does not meet the above extension conditions, that is, when a user installs the extension memories into the memory-installing slots in noncompliance with the extension conditions, a memory error would occur, and the data reception and printing operations could not be carried out. In this case, the user must refer to a manual on the correct extension states (conditions) or, in the worst case, contact the manufacturer. Thus, implementing extension memories is complicated.

SUMMARY OF THE INVENTION

An object of this invention is to provide a printer in which a user can easily gain information on a correct installing state even when the user installs extension memories into incorrect slots.

To attain the above and other objects, the printer of this invention includes print means for printing characters and symbols on a print medium, control means for controlling the print means, and plural extension storing medium installing mechanisms connected to the control means and into which plural extension storing media are detachably installed. The printer also has condition storing means for preliminarily storing effective extension conditions when one or a plural extension storing media are extended to all or some of the plural extension storing medium installing mechanisms in association with the memory capacity of the extension storing media. Identifying means are employed for identifying the presence or absence of an extension storing medium and the capacity of the extended extension storing medium for each of the plural extension storing medium installing mechanisms. Also included are determining means for determining the meeting of an installing state of the extended storing medium to the extension conditions stored in the condition storing means on the basis of the identification result of the identifying means. Notifying means finds a correct installing state of the extended storing medium based on the identification result of the identifying means and the extension conditions of the condition storing means. This occurs when the determining means determines that the installing state of the extended storing medium does not meet the extension conditions stored in the condition storing means and notifies the user of at least information on the correct installing state of the extended storing medium.

According to the printer of this invention thus constructed, the condition storing means preliminarily stores the effective extension conditions when one or a plural extension storing media are stored into all or some of the plural extension storing medium installing mechanisms associated with the memory capacity of the extension storing medium. The identifying means identifies the presence or absence of the extension storing medium and memory capacity of the extended extension storing medium for each of the plural extension storing medium installing mechanisms. Further, on basis of the identification result of the identifying means, the determining means determines whether the installing state of the extension storing medium meets the extension conditions stored in the condition storing means. As a result, when the determining means determines that the installing state of the extension storing medium does not meet the extension conditions, the notifying means finds the correct installing state of the extension storing medium on the basis of the identification result of the identifying means and the extension conditions of the condition storing means. The notifying means also notifies the user at least of information on the correct installing state of the extension storing medium.

As described above, when the presence or absence of the extension storing media installed into all or some of the extension storing medium installing mechanisms and the memory capacity of the extension storing media does not meet the extension conditions, the user is notified at least of information on the correct installing state of the extension storing media. Accordingly, referring to the information, the user can very easily install the extension storing media into the normal (correct) extension storing medium installing mechanisms without referring to the manual or contacting the manufacturer. Therefore, this invention provides the industry with the remarkable effect of simplifying the extension work of the extension storing media.

BRIEF DESCRIPTION OF THE DRAWINGS

Preferred embodiments of the present invention are described in detail with reference to the following figures wherein:

FIG. 2 is a table showing extension conditions;

FIG. 6 is a schematic diagram showing set contents of an extension state table;

FIG. 7 is a schematic diagram of a print example of information for a normal installing state;

DETAILED DESCRIPTION OF PREFERRED EMBODIMENTS

Preferred embodiments according to this invention are described referring to the accompanying drawings.

A first embodiment is applied to a laser printer LP that executes a printing operation upon receiving document data or image data from external equipment such as a host computer.

Figure 1:
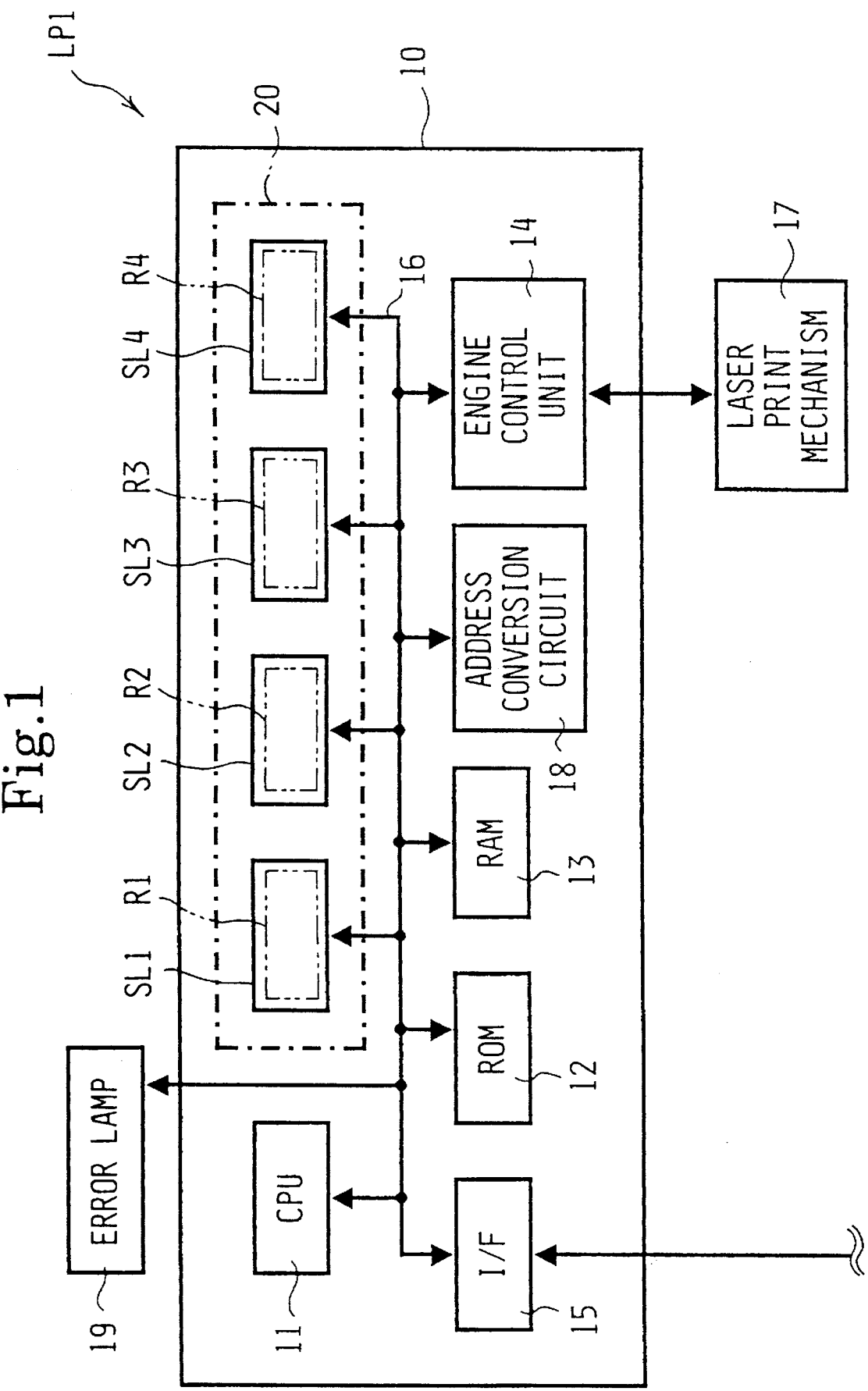
FIG. 1 is a block diagram for a control system of a laser printer according to a first embodiment.

First, the construction of a control unit for a laser printer of a first embodiment is described referring to FIG. 1. The control unit of this embodiment is basically identical to that of a general laser printer, and, therefore, it will be briefly described.

A control unit 10 serving as control means for the laser printer LP1 includes a CPU 11, a ROM 12, a RAM 13, an engine control unit 14, a data receiving interface (I/F) 15, a bus 16, and an address conversion circuit 18. The ROM 12, the RAM 13, the engine control unit 14, the data receiving interface (I/F) 15 and the address conversion circuit 18 are connected to the CPU 11 through the bus 16 comprising a data bus or the like. Serial or parallel print data transmitted from the external equipment such as a host computer (not shown) or the like the data receiving interface (I/F) 15 is supplied to the bus 16.

The ROM 12 has programs stored therein for an initial setting control containing an extension memory check control as described later and is executed upon power-on, a print processing control, and other controls.

The RAM 13 is equipped with a print data memory, a font data memory and an image data memory. From the received data, print data to be subjected to a print processing and fixed form data are stored in the print data memory. The font data memory is stored with common font data used to print characters, symbols and marks transmitted from the external equipment. The image data memory is stored with image data comprising dot-pattern data.

The engine control unit 14 comprises a microcomputer equipped with a CPU, a ROM and a RAM. It supplies a driving signal to a laser print mechanism 17.

As shown in FIG. 1, the control unit 10 is connected through the bus 16 to an extension memory unit 20 comprising four memory-installing slots SL1 to SL4 into which extension memories (boards) R1 to R4 can be installed, thereby extending the font data memory, the image data memory, etc. In this embodiment, it is assumed that four kinds of extension memories having extension capacity "1MB (mega bytes)", "2MB", "4MB" and "8MB", respectively, are used. Further, in this embodiment, the number of the memory-installing slots SL1 to SL4 is set to four.

Further, when extension memories R are installed into all or some of the four memory-installing slots SL1 to SL4 to extend the memory capacity, according to the circuit design of the address conversion circuit 18 provided to the control unit 10, a restriction in hardware is imposed on the selection as to which memory-capacity extension memory R can be installed into which memory-installing slot (one of SL1 to SL4). As described above, the address conversion circuit 18 is provided to simplify the address management of the extension memories R1 to R4. To design the address conversion circuit in a simple structure and reduce the cost thereof, an effective condition for installing (extending) one or plural extension memories into all or some of the plural memory-installing slots is required. Accordingly, as shown in FIG. 2, those effective extension conditions determined considering the above restriction are preliminarily set in an extension condition table JT in association with the memory capacity of the extension memory R and stored in the ROM 12. This extension condition table JT corresponds to the condition storing means.

The bus 16 is connected to an error lamp (LED) 19. When an error as described later occurs, the CPU 11 turns on the error lamp 19 to notify the user of the occurrence of the error.

Two extension conditions in this embodiment are briefly described as follows. Under one extension condition, any one to four extension memories R of any memory capacity can be combined and used to extend the memory capacity. However, these extension memories R must be successively installed into the memory-installing slots from the first installing-slot SL1. Under the other extension condition, the extension memories must be successively installed from the extension memory having the minimum memory capacity into the first installing slot SL1, the second installing slot SL2, . ., the fourth installing slot SL4, in this order.

Figure 3:
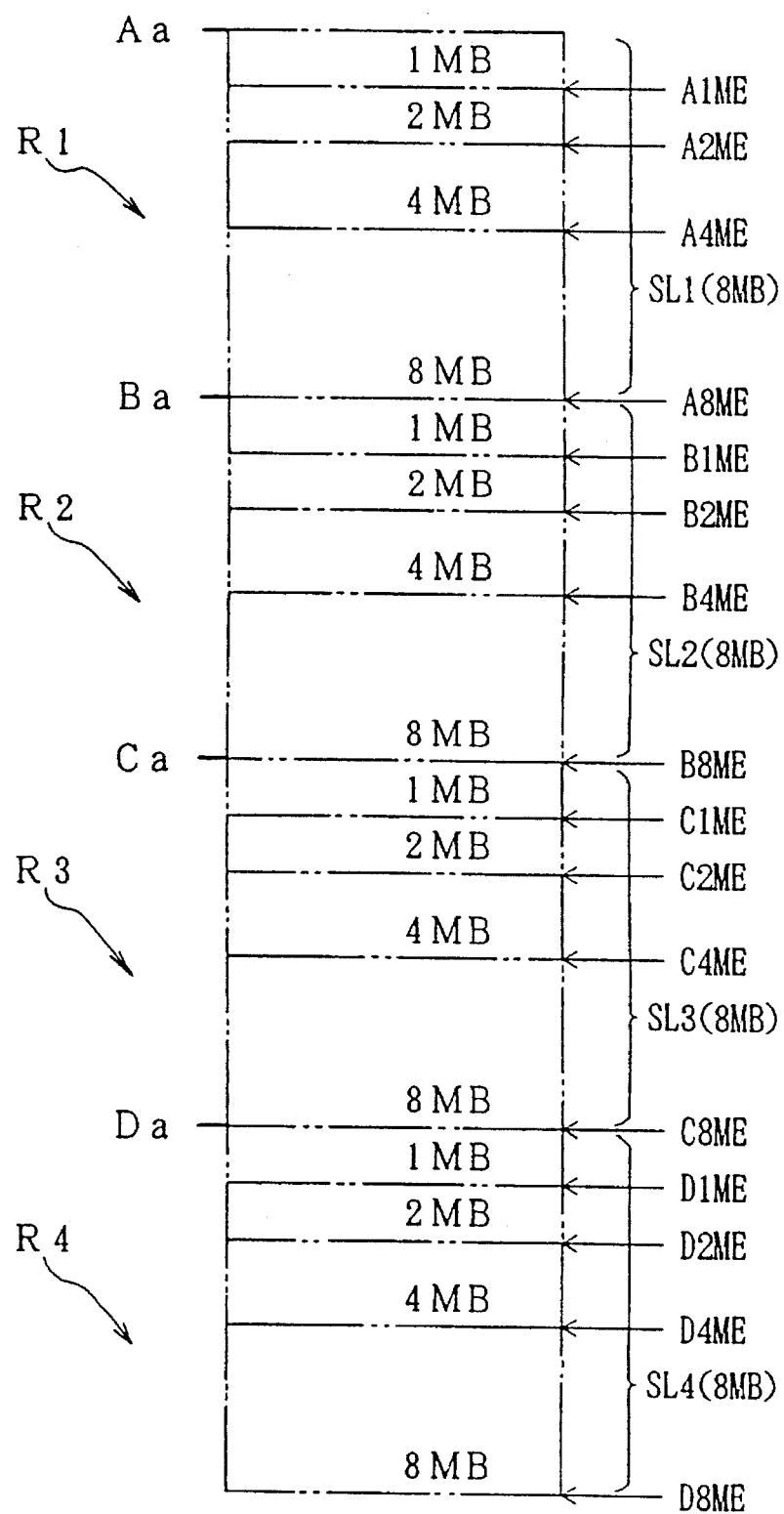
FIG. 3 is a schematic diagram showing an extension memory map for an extension memory that is installed into each installing slot.

Further, as shown in FIG. 3, when the extension memory R1 installed into the first installing slot SL1 has a memory capacity of "1MB", a top address "Aa" and a bottom address "A1ME" are allocated to the extension memory R1. When the memory capacity is "2MB", a top address "Aa" and a bottom address "A2ME" are allocated to the extension memory R1 installed into the first installing slot SL1. When the memory capacity is "4MB", a top address "Aa" and a bottom address "A4ME" are allocated to the extension memory R1 installed into the first installing slot SL1.

Likewise, when the memory capacity is "8MB", a top address "Aa" and a bottom address "A8ME" are allocated to the extension memory R1 installed into first installing slot SL1. For the extension memories R2 to R4, which are installed into the second installing slot SL2 to the fourth installing slot SL4, top addresses "Ba", "Ca" and "Da" and a suitable bottom address are allocated to these extension memories as shown in FIG. 3.

Figure 4:
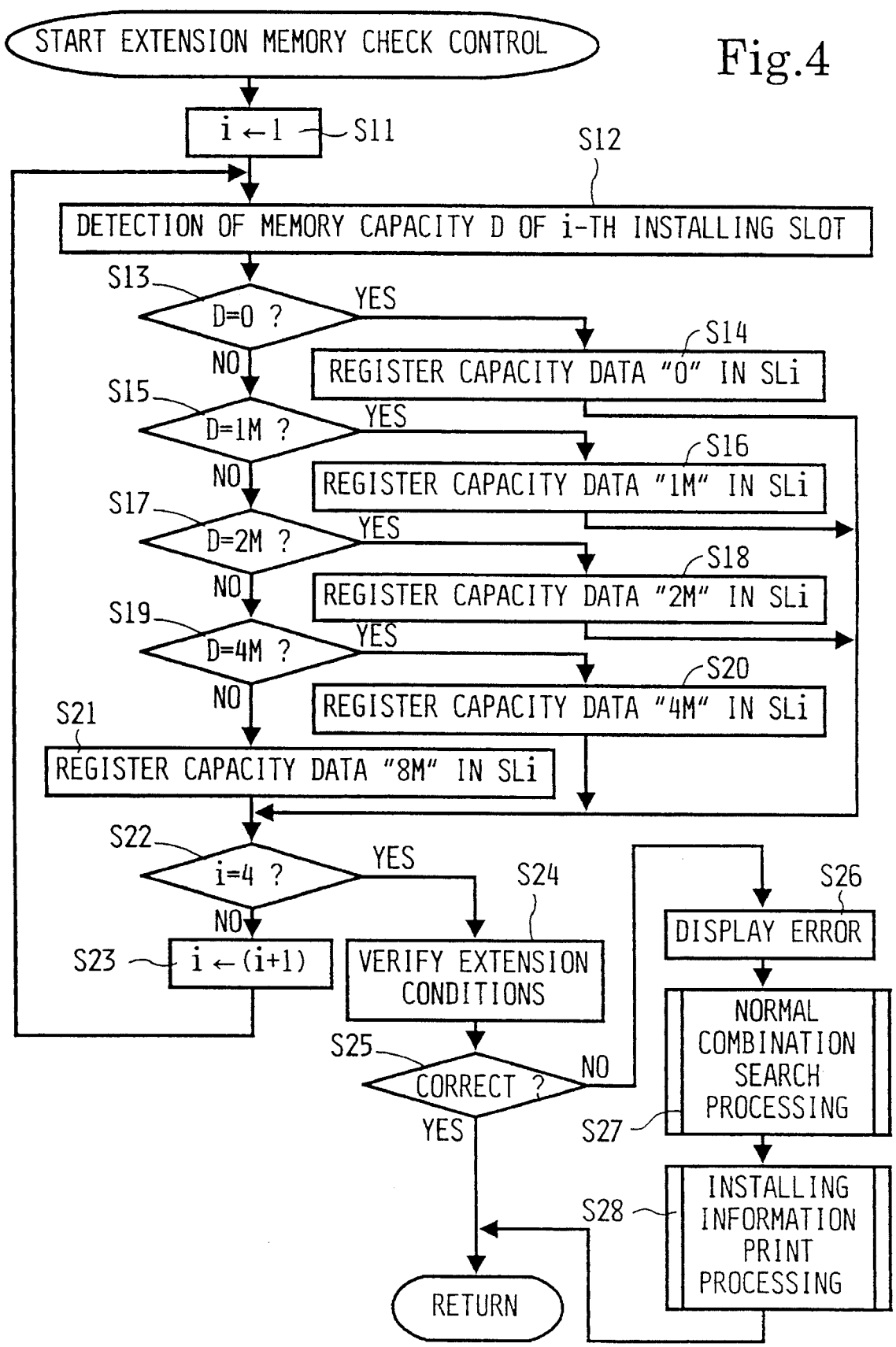
FIG. 4 is a flowchart for a routine of an extension memory check control.
Figure 5:
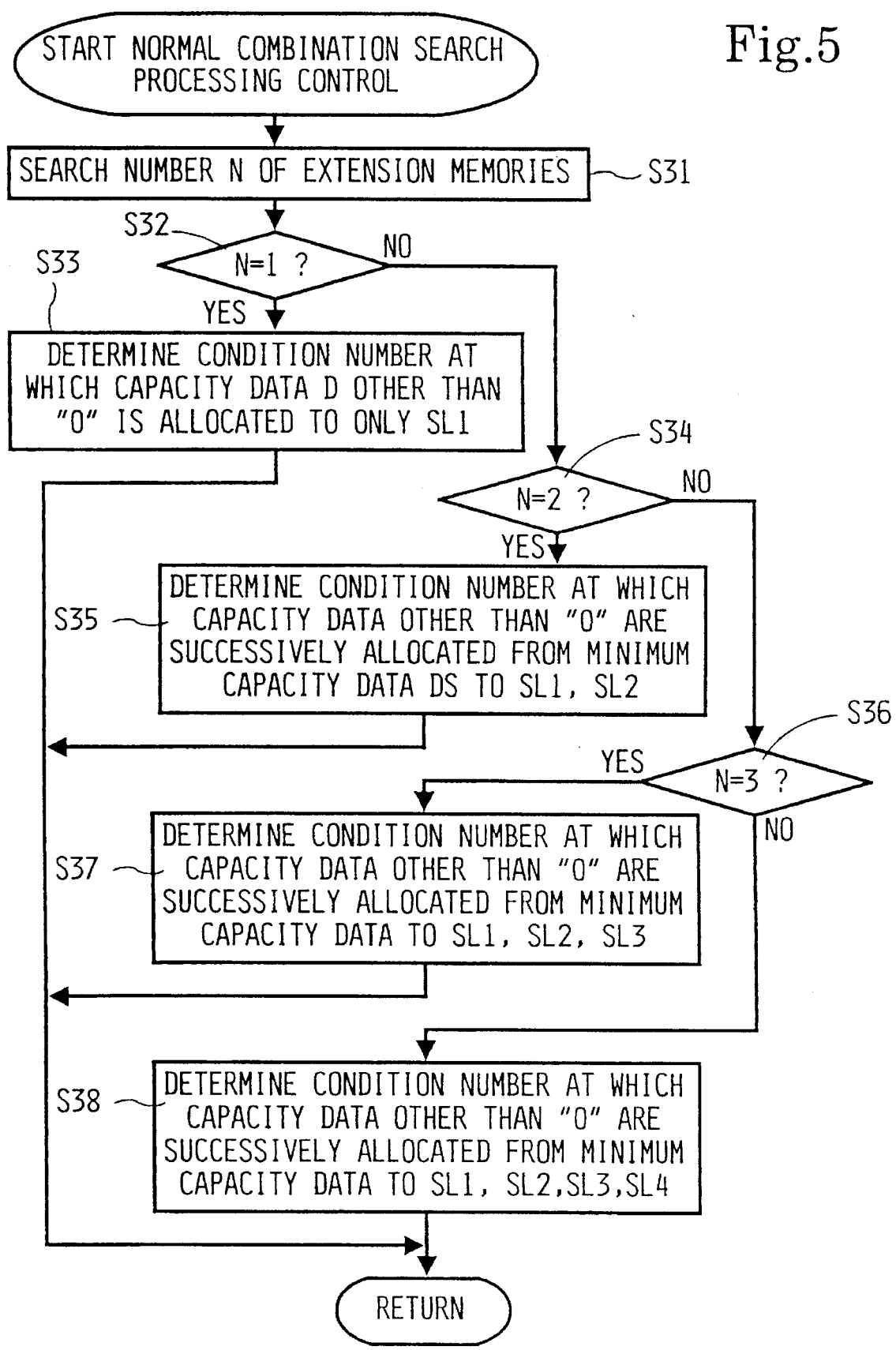
FIG. 5 is a flowchart for a routine of a normal combination search processing control.

Next, the routine of the extension memory check control executed by the control unit 10 is described referring to the flowcharts of FIGS. 4 to 5. The extension memory check control is contained in the initial setting control and is executed together with the initial setting every time a power source is switched on. In FIGS. 4 to 5, a reference character Si (i=11, 12, 13, ... ) represents each step.

Upon start of this control, the CPU 11 first sets "1" to a variable "i" (S11) and detects a memory capacity D of an extension memory Ri installed into an i-th installing slot SLi (S12). That is, the CPU 11 successively writes predetermined data into the bottom addresses "A1ME", "A2ME", "A4ME" and "A8ME" of the extension memory Ri, which is installed into the i-th installing slot SLi, and then reads out the data to detect the memory capacity D of the extension memory Ri.

Thereafter, when the detected memory capacity is "0" (S13:Yes), it is determined that no extension memory Ri is installed into the i-th installing slot Lsi. As shown in FIG. 6, "0" is registered as a capacity data D corresponding to the slot number SLi of the extension state table TB provided to the RAM 13 (S14). Thereafter, the program of the CPU 11 goes to step S22. When the detected memory capacity D is "1MB" (S13:No, S15:Yes), "1MB" is registered as a capacity data D corresponding to the slot number SLi of the extension state table TB (S16), and the program of the CPU 11 goes to step S22.

Likewise, when the detected memory D is "2MB" (S13 and S15: No, S17:Yes), "2MB" is registered as a capacity data D corresponding to the slot number SLi of the extension state table TB (S18), and the program of the CPU 11 goes to step S22. When the detected memory capacity is "4MB" (S13, S15 and S17: No, S19: Yes), "4MB" is registered as a capacity data D corresponding to the slot number SLi of the extension state table TB (S20), and the program of the CPU 11 goes to step S22. Further, when the detected memory capacity D is "8MB" (S13, S15, S17 and S19: No), "8MB" is registered as a capacity data D corresponding to the slot number SLi of the extension state table TB (S21), and the program of the CPU 11 goes to step S22.

Next, the CPU 11 checks the value of the variable i (S22). If the value of the variable i is not "4" (S22: No), the CPU 11 increments the value of the variable i by "1" (S23), and the program of the CPU 11 returns to the step S12. Thereafter, the CPU 11 repetitively executes the steps S12 to S23.

When the CPU 11 detects all the memory capacities D of the first to fourth installing slots SL1 to SL4 (S22: Yes), the CPU 11 verifies the combination of the capacity data of the extension state table TB and the extension conditions that are set in the extension condition table JT (S24). If the CPU 11 determines that the installing state of the extension memory R meets the extension conditions (S25: Yes), this control is terminated because the extension memory R is determined to be effective. Then, the program of the CPU 11 goes to a main routine. However, if the CPU 11 determines that the installing state of the extension memory R does not meet the extension conditions (S25: No), the CPU 11 turns on the error lamp (LED) 19 as shown in FIG. 1 (S26) and executes the normal combination search processing control as shown in FIG. 4 (S27) and FIG. 5.

For example, when the capacity data D of the first to fourth installing slots SL1 to SL4 are detected as "0", "2MB", "8MB" and "0" respectively shown in the extension table TB shown in FIG. 6, the CPU 11 determines that the extension conditions are not satisfied and turns on the error lamp 19.

Upon start of the normal combination search processing control, first the CPU 11 searches the number N of the extended extension memories R on the basis of the extension state table TB (S31). When the number N is equal to "1" (S32: Yes), the CPU 11 determines a condition number of the extension condition table JT as shown in FIG. 2 at which the capacity data D (1MB, 2MB, 4MB and 8MB) other than "0" are allocated to only the first installing slot SL1 (S33). That is, from the condition numbers "2" to "5" on the extension condition table JT, the CPU 11 determines the condition number at which the capacity data D is allocated to the first installing slot SL1. Thereafter, the CPU 11 terminates this control, and the program of the CPU 11 goes to the extension memory check control at a step S28.

When the number N is equal to "2" (S32: No, S34: Yes), the CPU 11 determines a condition number on the extension condition table JT from the capacity data D wherein the smaller capacity data DS, other than "0", is allocated to the first installing slot SL1 and the larger capacity data DL is allocated to the second-installing slot SL2 (S35). At this time, when the two extension memories have the same memory capacity, any one of the memories may be installed into the first installing slot SL1. That is, from the condition numbers "6" to "15" on the extension condition table JT, the CPU 11 determines the condition number at which the capacity data DS and DL are allocated to the first and second installing slots SL1 and SL2 (S35). Thereafter, the CPU 11 terminates this control, and the program of the CPU 11 goes to the step S28 as described above.

When the number N is equal to "3" (S32 and S34: No, S36: Yes), the CPU 11 determines a condition number of the extension condition table JT from the capacity data D wherein the minimum capacity data DS, other than "0", is allocated to the first installing slot SL1, the middle (second largest (smallest)) capacity data DM is allocated to the second installing slot SL2 and the maximum capacity data DL is allocated to the third installing slot SL3 (S36). At this time, when the two or more extension memories have the same memory capacity, the installing slots SL are compatible between the extension memories having the same capacity. That is, from the condition numbers "16" to "35", the CPU 11 determines the condition number at which the capacity data DS, DM and DL are allocated to the first, second and third installing slots SL1, SL2 and SL3, respectively (S35). Thereafter, the CPU 11 terminates this control, and the program of the CPU 11 goes to step S28.

Further, when the number N is equal to "4" (S32, S34 and S36: No), the CPU 11 determines a condition number of the extension condition table JT at which the minimum capacity data DS is allocated to the first installing slot SL1, a second smallest capacity data DM is allocated to the second installing slot SL2, a second largest capacity data DL is allocated to the third installing slot SL3, and the maximum capacity data DXL is allocated to the fourth installing slot SL4 (S38). At this time, when the two or more extension memories have the same capacity, the installing slots SL are compatible between the extension memories having the same capacity. That is, from the condition numbers "36" to "70", the CPU 11 determines the condition number at which the capacity data DS, DM, DL and DXL are allocated to the first, second, third and fourth installing slots SL1 to SL4. Thereafter, the CPU 11 terminates the control, and the program thereof goes to step S28.

Thereafter, in the extension memory check control, the CPU 11 executes the print processing for printing information on an incorrect installing state based on the extension state table TB and information on a normal installing state based on the condition number that meets the extension conditions on a print sheet P (S28). Finally, the CPU 11 terminates the extension memory check control, and the program thereof goes to the main routine.

For example, when the extension state of the extension memories R does not meet the extension condition as shown in FIG. 6, a condition number "12" at which the minimum capacity data "2M" other than "0" is provided to the first installing slot SL1 and a next smallest capacity data "8M" is provided to the second installing slot SL2, is determined from the condition numbers "6" to "15". As shown in FIG. 7, the information on the incorrect installing state and the information on the correct installing state based on the condition number meeting the extension conditions are printed on the print sheet P. In this case, the information to be printed on the print sheet P may be only the information on the normal installing state based on the condition number that meets the extension conditions.

As described above, when the presence or absence of the extension memories R installed into all or some of the first to fourth installing slots SL1 to SL4 and the capacity D of the extension memory do not meet the extension conditions, the information on the incorrect installing state of the extension memories R and the information on the correct installing state are output and printed. Thus, the extension memories R can be installed into the normal memory installing slots by referring to the information. Therefore, the extension work of the extension memories R can be greatly simplified.

Figure 8:
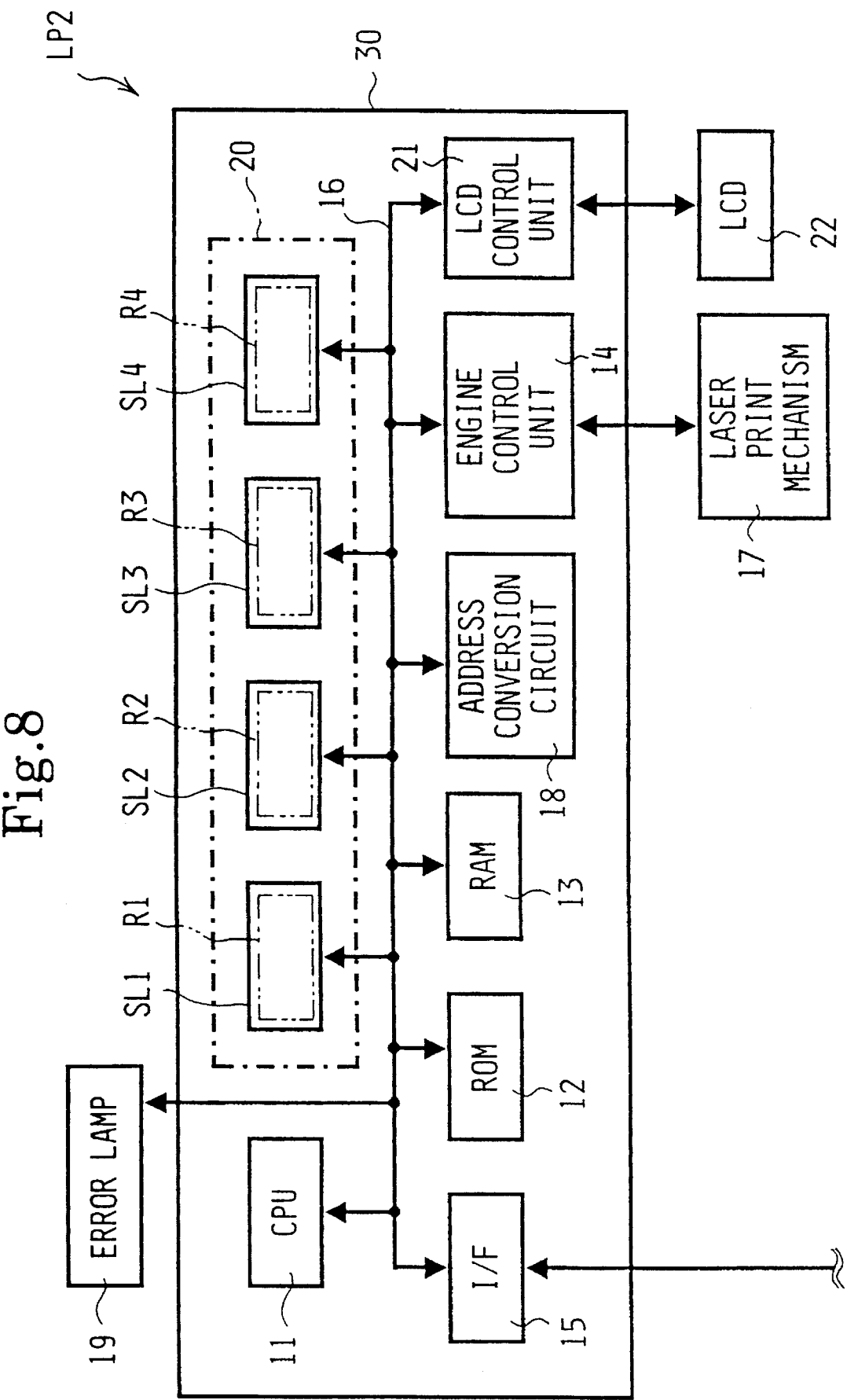
FIG. 8 is a block diagram showing a control system of a laser printer of a second embodiment.

Next, the construction of a control unit for a laser printer LP2 according to a second embodiment is described referring to FIG. 8. The control unit has the same construction as the control unit of the laser printer LP1 of the first embodiment, except for an LCD control unit 21 and a liquid crystal display unit (hereinafter referred to as "LCD") 22. Therefore, the description of the same elements is omitted from the following discussion. Further, the same elements as the control unit of the laser printer LP1 of the first embodiment are represented by the same reference numerals.

The control unit 30 serving as the control means for the laser printer LP2 comprises a CPU 11, a ROM 12, a RAM 13, an engine control unit 14, a data receiving interface (I/F) 15, a bus 16, an address conversion circuit 18 and an LCD control unit 21.

The LCD control unit 21 is connected to an LCD 22 that is provided at a portion of the armor of the main body of the laser printer LP2. According to the laser printer LP1 of the first embodiment, the information on the normal installing state based on the condition number meeting the extension conditions, etc. are printed on the print sheet P, as shown in FIG. 7. However, in this embodiment, at least the information on the normal installing state based on the condition number meeting the extension conditions is displayed in the LCD 22 by the LCD control unit 21. Of course, information regarding the incorrect installation may be displayed in the LCD 22 by the LCD control unit 21 also.

At this time, the steps S11 to S27 as shown in the flowchart of FIG. 4 in the first embodiment are also used in this embodiment. Thus, the description thereof is omitted. The step S28 is altered from the installing information print processing to the installing information display processing.

Figure 9:
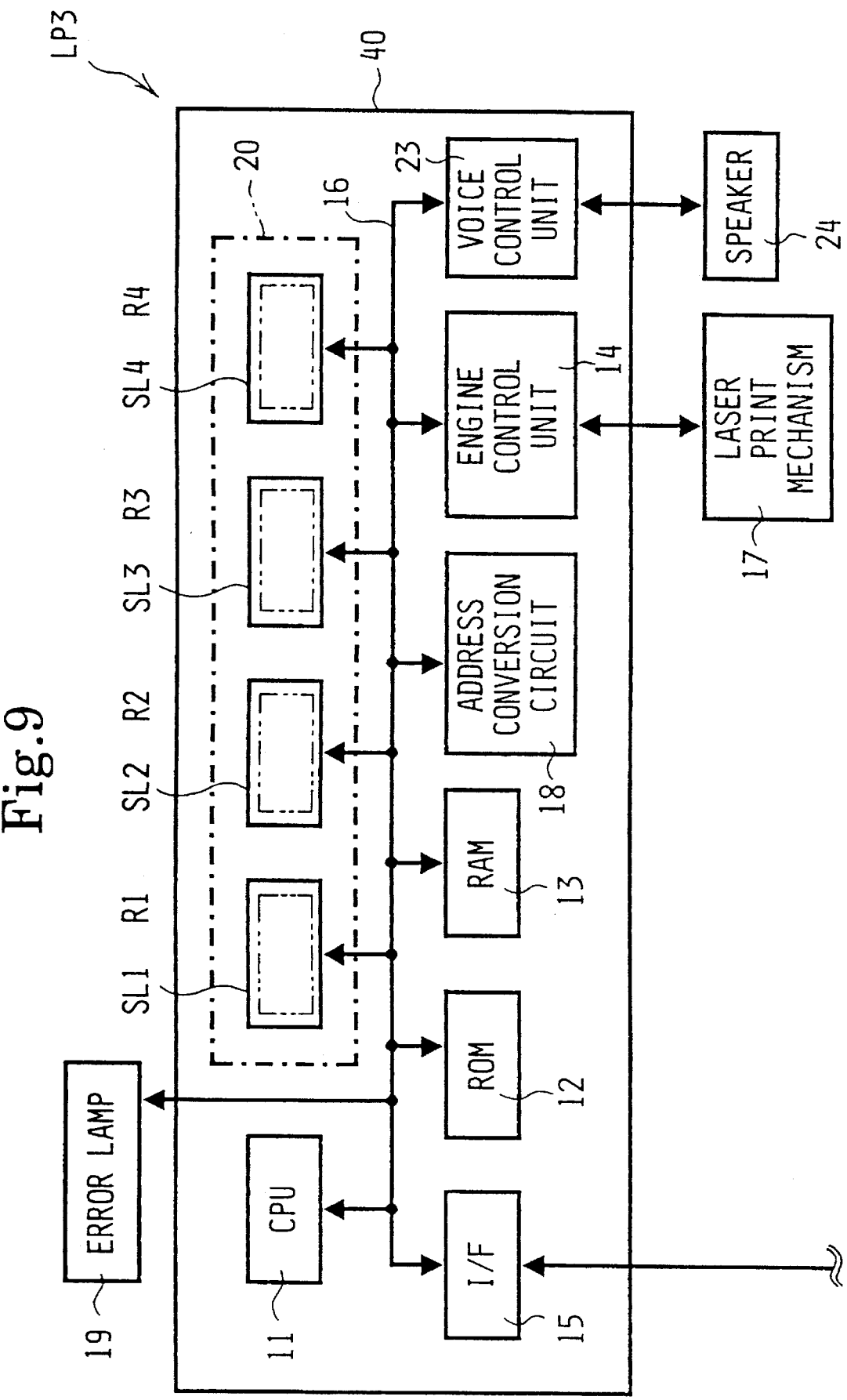
FIG. 9 is a block diagram showing a control system of a laser printer of a third embodiment.

Next, the construction of the control unit for the laser printer LP3 according to a third embodiment is described referring to FIG. 9. The construction of the control unit is identical to that of the laser printers LP1 and LP2 of the first and second embodiments, except for a voice control unit 23 and a speaker 24, and, therefore, the description of the same elements is omitted. Further, the same elements as the control system of the laser printer LP1 of the first embodiment are represented by the same reference numerals.

The control unit 40 serving as the control means for the laser printer LP3 includes a CPU 11, a ROM 12, a RAM 13, an engine control unit 14, a data receiving interface (I/F) 15, a bus 16, an address conversion circuit 18 and a voice control unit 23.

The voice control unit 23 is connected to a speaker 24 built in the main body of the laser printer LP3. According to the laser printer LP1 of the first embodiment, the information on the normal installing state based on the condition number meeting the extension conditions, etc. are printed on the print sheet P, as shown in FIG. 7. However, in this embodiment, at least the information on the normal installing state based on the condition number meeting the extension conditions is output as a voice from the speaker 24 by the voice control unit 23. Of course, information regarding the incorrect installation may be output from the speaker 24 by the voice control unit 23 also.

At this time, the steps S11 to S27 as shown in the flowchart of FIG. 4 in the first embodiment are also used in this embodiment, and thus the description thereof is omitted. Step S28 is altered from the installing information print processing to the installing information voice-output processing.

This invention is not limited to the above embodiments, and various modifications may be made to these embodiments without departing from the spirit and scope of this invention.

For example, the number of the memory-installing slots SL is not limited, and various kinds of extension memories R may be used. Further, this invention is applicable to various kinds of printers such as a printer adopting a dot-print system, or a printer adopting a thermal-print system, etc.

What is claimed is:

1. A printer comprising:

a memory that stores print data and extension memory installation conditions;

a printing mechanism that prints images based on the print data;

external memory receptacles for selectively detachably receiving extension memories; and a controller that controls the printing mechanism and the external memory receptacles, wherein the controller determines whether external memories are properly installed in the external memory receptacles "and are compatible with the controller," and generates user instructions based on the installation determination that instruct the user regarding proper installation of the installed external memories so that incorrect installation can be remedied.

2. The printer of claim 1 wherein the controller determines whether the external memories are installed properly based on circuit design of the controller.

3. The printer of claim 1 further comprising an alarm that is activated by the controller when installation of external memories in incorrect.

4. The printer of claim 3 further comprising an LED that is activated by the alarm to indicate incorrect installation.

5. The printer of claim 3 wherein the alarm generates a print out that indicates incorrect installation.

6. The printer of claim 3 further comprising an audio mechanism that is activated by the alarm to indicate incorrect installation.

7. The printer of claim 1 further comprising a display, wherein the controller generates the instructions on the display.

8. The printer of claim 1 wherein the controller generates the instructions by instructing the printing mechanism to print instructions.

9. The printer of claim 1 further comprising an audio mechanism, wherein the controller generates audible instructions.

10. The printer of claim 1 wherein the memory stores a table of external memory installation conditions based on memory capacity for each of the external memory receptacles and proper memory combinations for the external memory receptacles.

11. The printer of claim 1 wherein the controller determines whether external memories are properly installed in the external memory receptacles by detecting memory capacity of any installed external memories and comparing the detected memory capacity to stored external memory installation conditions.

12. A printer comprising:

print means for printing characters and symbols on a print medium;

control means for controlling said print means;

plural extension memory installing mechanisms coupled to the control means that detachably receive extension memories;

memory means for storing data including effective extension conditions when one or plural extension memories are installed in the extension memory installing mechanisms based on memory capacity of the extension memories;

identifying means for identifying the presence of an installed extension memory and memory capacity of an installed extension memory for each of the extension memory installing mechanisms;

determining means for determining whether an installed extension memory matches an extension condition stored in the memory means based on the identification result of the identifying means; and notifying means for notifying a user of an incorrect installation and thereby generating information for the user regarding proper installation based on the identification result of the identifying means and the stored extension conditions so that a user can correctly install the extension memory.

13. The printer of claim 12, wherein the notifying means comprises information output control means for controlling the print means to print at least the information on correct installation of the extension memories on a print medium.

14. The printer of claim 12, further comprising display means for displaying at least the information on correct installation of the extension memories, wherein the notifying means comprises information display control means for controlling the display means to display at least the information on the correct installation of the extension memories.

15. The printer of claim 12, further comprising audio means for audibly outputting at least the information on the correct installation of the extension memories, wherein the notifying means comprises audio information output control means for controlling the audio means.

16. A method of instructing the installation of extension memories in a printer having a controller and extension memory receptacles, the method comprising the steps of:

storing extension conditions of each receptacle including acceptable combinations of extension memories and a memory capacity of each extension receptacle;

detecting the presence of extension memories in each of the extension memory receptacles and determining the memory capacity of each of the installed extension memories;

comparing the memory capacity of the installed extension memories with the stored extension conditions; and outputting installation information about correct installation of the installed extension memories when the installation is improper so that a user can correctly install the extension memories.

17. The method of claim 16 further comprising the step of searching for a normal installation combination after the step of comparing, wherein the step of searching includes determining the number and capacity of any installed extension memories and determining proper installation conditions for the number and capacity of the installed extension memories.

18. The method of claim 16 wherein the step of storing proper installation conditions includes storing the conditions based on circuit design of the printer.

19. The method of claim 16 further comprising the steps of warning of improper installation of extension memories when the comparison does not result in a match.

* * * * *